United States Patent
Wei

(10) Patent No.: US 11,709,601 B2
(45) Date of Patent: Jul. 25, 2023

(54) REDUNDANCY METADATA FOR MULTI-PLANE MEMORY ACCESS FAILURE

(71) Applicant: MICRON TECHNOLOGY, INC., Boise, ID (US)

(72) Inventor: Meng Wei, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/407,898

(22) Filed: Aug. 20, 2021

(65) Prior Publication Data

US 2023/0058217 A1 Feb. 23, 2023

(51) Int. Cl.
*G06F 3/06* (2006.01)
*G06F 11/14* (2006.01)

(52) U.S. Cl.
CPC ............ *G06F 3/0619* (2013.01); *G06F 3/064* (2013.01); *G06F 3/0656* (2013.01); *G06F 3/0659* (2013.01); *G06F 3/0679* (2013.01); *G06F 11/1435* (2013.01)

(58) Field of Classification Search
CPC .. G06F 3/0619; G06F 3/0656; G06F 11/1435; G06F 3/064; G06F 3/0679; G06F 3/0659
See application file for complete search history.

(56) References Cited

U.S. PATENT DOCUMENTS

| | | |
|---|---|---|
| 2012/0198123 A1 | 8/2012 | Post |
| 2014/0344524 A1 | 11/2014 | Shalvi |
| 2017/0364408 A1* | 12/2017 | Sherman ............... G06F 3/0673 |
| 2019/0171522 A1 | 6/2019 | Chang et al. |
| 2020/0005874 A1* | 1/2020 | Shappir .................. G11C 16/26 |
| 2020/0409808 A1 | 12/2020 | Seetharaman et al. |
| 2021/0200461 A1 | 7/2021 | Muchherla et al. |

OTHER PUBLICATIONS

PCT International Search Report and Written Opinion for International Application No. PCT/US2022/040949, dated Nov. 29, 2022 10 pages.

* cited by examiner

*Primary Examiner* — Mark A Giardino, Jr.
(74) *Attorney, Agent, or Firm* — Lowenstein Sandler LLP

(57) ABSTRACT

A first data item is programmed to a first set of logical units of a memory sub-system. The first set of logical units is associated with a first fault tolerant stripe. A second data item is programmed to a second set of logical units of a memory sub-system. The second set of logical units is associated with a second fault tolerant stripe. A first set of redundancy metadata corresponding to the first data item and a second set of redundancy metadata corresponding to the second data item is generated. A combined set of redundancy metadata is generated based on at least the first set of redundancy metadata and the second set of redundancy metadata. The combined set of redundancy metadata is stored at a specified memory device of the memory sub-system.

20 Claims, 9 Drawing Sheets

REDUNDANCY METADATA FOR MULTI-PLANE MEMORY ACCESS FAILURE

TECHNICAL FIELD

Embodiments of the disclosure relate generally to memory sub-systems, and more specifically, relate to redundancy metadata for multi-plane memory access failure.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
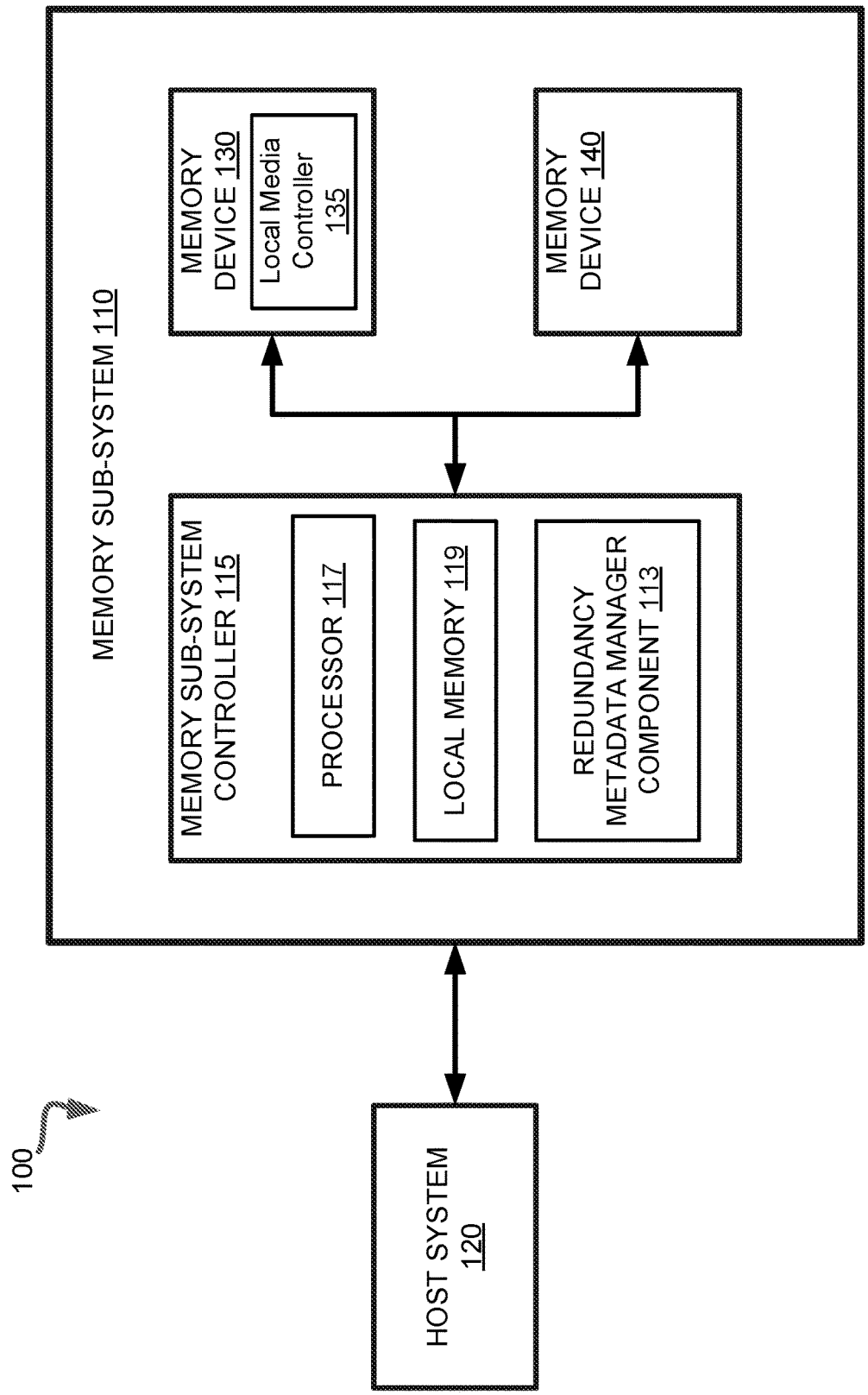
FIG. 1 illustrates an example computing system that includes a memory sub-system, in accordance with some embodiments of the present disclosure.

Aspects of the present disclosure are directed to redundancy metadata for a multi-plane memory access failure. A memory sub-system can be a storage device, a memory module, or a combination of a storage device and memory module. Examples of storage devices and memory modules are described below in conjunction with FIG. 1. In general, a host system can utilize a memory sub-system that includes one or more memory components, such as memory devices that store data. The host system can provide data to be stored at the memory sub-system and can request data to be retrieved from the memory sub-system.

A memory sub-system can utilize one or more memory devices, including any combination of the different types of non-volatile memory devices and/or volatile memory devices, to store the data provided by the host system. In some embodiments, non-volatile memory devices can be provided by negative-and (NAND) type flash memory devices. Other examples of non-volatile memory devices are described below in conjunction with FIG. 1. A non-volatile memory device is a package of one or more dice. Each die can include one or more planes. A plane is a portion of a memory device that includes multiple memory cells. Some memory devices can include two or more planes. For some types of non-volatile memory devices (e.g., NAND devices), each plane includes a set of physical blocks. Each block includes a set of pages. "Block" herein shall refer to a set of contiguous or non-contiguous memory pages. An example of a "block" is an "erasable block," which is the minimal erasable unit of memory, while "page" is a minimal writable unit of memory. Each page includes a set of memory cells. A memory cell is an electronic circuit that stores information.

As described above, a die can contain one or more planes. A memory sub-system can use a striping scheme to treat various sets of data as units when performing data operations (e.g., write, read, erase, etc.). A die stripe refers to a collection of planes that are treated as one unit when writing, reading, or erasing data. A controller of a memory device (i.e., a memory sub-system controller, a memory device controller, etc.) can execute the same operation can carry out the same operation, in parallel, at each plane of a dice stripe. A block stripe is a collection of blocks, at least one from each plane of a die stripe, that are treated as a unit. The blocks in a block stripe can be associated with the same block identifier (e.g., block number) at each respective plane. A page stripe is a set of pages having the same page identifier (e.g., the same page number), across a block stripe, and treated as a unit.

A host system can initiate a memory access operation (e.g., a programming operation, a read operation, an erase operation, etc.) on a memory sub-system. For example, the host system can transmit a request to a memory sub-system controller, to program data to and/or read data from a memory device of the memory sub-system. Such data is referred to herein as "host data." The memory sub-system controller can execute one or more operations to access the host data in accordance with request. As data is accessed at a memory cell of a memory device, the memory cell can deteriorate and eventually become defective. For example, when a host system initiates too many memory access operations for host data stored at a memory device, the memory cells that store the host data, as well as the adjacent memory cells at the memory device, can become corrupted. In some instances, a memory access operation (e.g., a read operation, etc.) performed by a memory sub-system controller to access data at one or more memory pages at each plane of a memory device can fail. Such failure is referred to herein as a multi-plane memory access failure.

A memory sub-system can support a redundancy mechanism to protect host data against a memory access failure. For example, for a NAND type flash device, the memory sub-system can implement redundant array of independent NAND (RAIN) operations to provide redundancy for the data stored on the memory sub-system. When host data is received from the host system to be programmed to a memory device of the memory sub-system, a memory sub-system controller can generate redundancy metadata (e.g., parity data) based on an exclusive-or (XOR) operation with the received host data and can use the redundancy metadata to reconstruct or recalculate the host data in the event of a failure of a portion of the memory device that is storing host data. As an example, the memory sub-system controller can generate the redundancy metadata based on an XOR operation applied to host data stored at a particular number of data locations of a logical unit (LUN) (e.g., a page, a block) of the memory sub-system. If a portion of a memory device storing the host data fails and the corresponding data is lost or corrupted, the memory sub-system controller can reconstruct the lost/corrupted data based on an XOR operation among the rest of the host data and the redundancy metadata.

A portion of memory at a memory sub-system can be reserved to store redundancy metadata generated for host data stored at other portions of memory at the memory sub-system. In some systems, the reserved portion of memory can correspond to a specified memory device that is configured to store redundancy metadata generated for host data stored at other memory devices of the memory sub-system. For example, a memory sub-system can include multiple stripes across multiple memory devices of the memory sub-system that are specified to store host data. An additional memory device of the memory sub-system can be specified to store redundancy metadata associated with host data residing at LUNs associated with each stripe across the multiple memory devices. In some instances, a distinct portion (e.g., a plane) of the additional memory device can be specified to store redundancy metadata associated with a respective stripe of the multiple memory devices. As host data is programmed to a LUN (i.e., at one of the multiple memory devices) that is associated with the respective stripe, the memory sub-system controller can generate redundancy metadata for the respective stripe and can store the generated redundancy data at the specified portion of the additional memory device. By storing redundancy metadata associated with each stripe of the memory sub-system at a distinct portion (e.g., a plane) of a specified memory device, the memory sub-system controller can recover host data residing at respective LUNs associated with multiple stripes of the memory sub-system after a multi-plane memory access failure at one or more of the multiple memory devices. However, by reserving an entire memory device to store such redundancy metadata, a significant amount of memory space at the memory sub-system is not available to store host data. This reduction in the amount of available memory space to store host data can render some memory sub-systems unusable for most, and in some instances all, host system data storage requirements.

In other instances, the portion of memory at a memory sub-system that is reserved to store redundancy metadata generated for the host data can correspond to a specified plane of a specified memory device. For example, as host data is programmed to LUNs at any of the multiple memory devices of a memory sub-system, the memory sub-system controller can generate redundancy metadata for the programmed host data and store the generated redundancy metadata to a reserved plane of a specified memory device. The memory sub-system controller can use the redundancy metadata at the reserved plane to recover host data residing at a LUN at any other plane of the specified memory device or the other memory devices of the memory sub-system after a memory access failure at such LUN. By storing the redundancy data at the reserved plane of the specified memory device, a larger amount of memory space is available at the memory sub-system to store host data than is available if an entire memory device is specified to store the redundancy metadata, as described above. However, the redundancy data stored at the reserved plane of the specified memory device can only be used to recover host data residing at a single LUN of the memory sub-system. Accordingly, the generated host data cannot be used to recover host data residing at respective LUNs associated with multiple stripes of a memory sub-system after a multi-plane memory access failure at one or more memory devices of the memory sub-system. A likelihood of a multi-plane memory access failure increases as the complexity of memory cell design increases. Given the increasing complexity of memory device design and the increasing demands of host data storage capacity, there is a need for memory sub-systems to provide a host data recovery scheme that enables recovery of host data after multi-plane memory access failure while maximizing the amount of memory space available to store host data.

Aspects of the present disclosure address the above and other deficiencies by providing redundancy metadata for a multi-plane memory access failure. In some embodiments, a portion of a specified memory device of a memory sub-system can be reserved to store redundancy metadata for each LUN (e.g., block, page, etc.) at the memory sub-system that is allocated for storage of host data (referred to as a host-allocated LUN herein). Such portion of the specified memory device is referred to as a redundancy metadata storage location. In some embodiments, the redundancy metadata storage location can correspond to a specified plane of the specified memory device. During operation of the memory sub-system, a memory sub-system controller can program data items received from the host system to an available host-allocated LUN. A data item refers to an atomic unit of data that is written to and/or read from a LUN of the memory sub-system. For example, a data item can correspond to a data block or to a key-value pair. Responsive to programming the received data items to the host-allocated LUN, the memory sub-system controller can generate redundancy metadata data that corresponds to the data item. For example, the memory sub-system controller can execute an exclusive or (XOR) operation based on the data item to generate the redundancy metadata.

In some embodiments, the memory sub-system can include multiple fault tolerant stripes across multiple memory devices of the memory sub-system. A fault tolerant stripe refers to a collection of LUNs (e.g., blocks, pages, etc.) at particular regions (e.g., planes) of two or more memory devices of the memory sub-system that store data items that can be recovered by the same one or more data recovery operations executed by the memory sub-system controller. A distinct memory buffer (e.g., at a local memory for the memory sub-system controller) can be reserved to temporarily store redundancy metadata generated for LUNs associated with each respective fault tolerant stripe of the memory sub-system. In some embodiments, the host-allocated LUN that stores the data item can be associated with a particular fault tolerant stripe of the memory sub-system. The memory sub-system controller can generate redundancy metadata for data items programmed to LUNs at each fault tolerant stripe of the memory device and can temporarily store the generated redundancy metadata at a respective memory buffer reserved for each fault tolerant stripe.

The memory sub-system controller can then generate a combined set of redundancy metadata based on the redundancy metadata that is temporarily stored at each of the respective memory buffers. In an illustrative example, the memory sub-system controller can program a data item received from the host system to a host-allocated LUN associated with a first fault tolerant stripe of the memory sub-system and can generate first redundancy metadata corresponding to the data item. Responsive to storing the first redundancy metadata at a first buffer associated with the first fault tolerant stripe, the memory sub-system controller can generate a combined set of redundancy metadata based on the first redundancy metadata and second redundancy metadata that is stored at a second buffer associated with a second fault tolerant stripe. The second redundancy metadata can correspond to another data item that is programmed to another host-allocated LUN associated with the second fault tolerant stripe. In some embodiments, the memory sub-system controller can generate the combined set of redundancy data by executing an XOR operation based on at least the first redundancy metadata stored at the first buffer and the second redundancy metadata stored at the second buffer. In some embodiments, additional redundancy metadata can be stored at additional buffers that are reserved for additional fault tolerant stripes of the memory sub-system. In such embodiments, the memory sub-system controller can also apply the XOR operation based on the additional redundancy metadata stored at such buffers to generate the combined set of redundancy metadata. Responsive to generating the combined set of redundancy metadata, the memory sub-system controller can store the combined set of redundancy metadata at the reserved redundancy metadata storage location described previously.

In some instances, the memory sub-system controller can detect that a failure has occurred during a memory access operation (e.g., read operation, etc.) performed at one or more LUNs of the memory sub-system. For example, the memory sub-system controller can determine that a multi-plane memory access failure has occurred for memory pages at each plane of a particular memory device (i.e., during execution of one or more read operations for those memory pages). Responsive to detecting the memory access operation failure, the memory sub-system controller can retrieve the combined set of redundancy metadata from the redundancy metadata storage location (e.g., located at the particular plane of the specified memory device, as described above).

In some embodiments, the memory sub-system controller can perform a data recovery process to recover the data items at each of the memory pages that were subject to the memory access operation failure based on the retrieved combined set of redundancy metadata. For example, the memory sub-system controller can execute one or more XOR operations based on at least the combined set of redundancy metadata to generate one or more sets of redundancy metadata each associated with a respective fault tolerant stripe. The memory sub-system controller can than execute one or more additional XOR operations using each set of redundancy metadata associated with each respective fault tolerant stripe to recover the data items of the failed memory pages. For example, in some embodiments, the memory sub-system controller can generate at least a set of redundancy metadata associated with the first fault tolerant stripe and a second fault tolerant stripe of the memory sub-system by executing the one or more XOR operations based on the combined set of redundancy metadata. The memory sub-system controller can then execute a XOR operation using the set of redundancy metadata to recover a first data item stored at a failed LUN associated with the first fault tolerant stripe and a second data item stored at a failed LUN associated with the second fault tolerant stripe. In another example, the first memory sub-system can generate at least a first set of redundancy metadata associated with the first fault tolerant stripe and a second set of redundancy metadata associated with the second fault tolerant stripe. The memory sub-system controller can execute an XOR operation using the first set of redundancy metadata to recover a first data item stored at a failed LUN associated with the first fault tolerant stripe and another XOR operation using the second set of redundancy metadata to recover a second data at a failed LUN associated with the second fault tolerant stripe. In some embodiments, the memory sub-system can execute these XOR operations concurrently (e.g., as parallel execution threads) or approximately concurrently. Responsive to recovering the first data item and the second data item, the memory sub-system controller can program the recovered first data item and the recovered second data item to other LUNs of the memory sub-system (e.g., at another memory device of the memory sub-system).

Advantages of the present disclosure include, but are not limited to, providing a host data recovery scheme that enables recovery of host data after multi-plane memory access failure while maximizing the amount of memory space available to store host data. By generating redundancy metadata for each fault tolerant stripe of a memory sub-system, a memory sub-system controller can recover data items at LUNs of one or more memory devices of the memory sub-system after a multi-plane memory access failure. By combining the redundancy metadata for each fault tolerant stripe into a combined set of redundancy metadata that is stored at a specified memory device (and/or a specified portion of the specified memory device), the amount of space of the memory sub-system that is allocated to store redundancy metadata for each fault tolerant stripe is minimized. Accordingly, a significant amount of space of the memory sub-system is made available to store host data. By maximizing the amount of memory space available to store host data, more host data can be stored at the memory sub-system and a fewer number of operations are performed to make LUNs available at the memory sub-system to store incoming host data. As a result, a significant amount of system resources are made available for other processes, which increases overall system efficiency and reduces overall system latency.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a negative-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local controller 132) on the die and a controller (e.g., memory sub-system controller 115) for media management within the same memory device package. An example of a managed memory device is a managed NAND (MNAND) device.

The memory sub-system 110 includes a redundancy metadata manager component 113 that can manage redundancy data generated for host data stored at one or more portions of a memory device 130, 140. In some embodiments, the memory sub-system controller 115 includes at least a portion of the redundancy metadata manager component 113. For example, the memory sub-system controller 115 can include a processor 117 (processing device) configured to execute instructions stored in local memory 119 for performing the operations described herein. In some embodiments, the redundancy metadata manager component 113 is part of the host system 120, an application, or an operating system.

Redundancy metadata manager component 113 can be configured to generate redundancy metadata for memory pages at two or more fault tolerant stripes (e.g., block stripes, page stripes, etc.) of memory sub-system 110. Redundancy metadata refers to metadata (e.g., parity data) generated for a data item programmed to a portion of a memory device 130, 140 that can be used by memory sub-system controller 115 to recover the data item after a failed memory access operation (e.g., write operation, read operation, etc.) at the portion of the memory device 130, 140. In some embodiments, redundancy metadata manager component 113 (also referred to as component 113 herein) can calculate or re-construct the failed data item by performing a data recover operation (e.g., an exclusive OR (XOR) operation) based on the redundancy metadata for the data item and one or more other data items stored at the memory device 130, 140 (or another memory device 130, 140 of memory sub-system 110).

A fault tolerant stripe refers to a collection of logical memory units (LUNs), such as blocks, pages, etc., at particular portions of two or more memory devices 130, 140 of memory sub-system 110 that store data items (e.g., host data) that are recoverable by component 113. A fault tolerant stripe can correspond to one or more stripes (e.g., block stripes, page stripes, etc.) of the memory sub-system. In some embodiments, component 113 can generate redundancy metadata for each fault tolerant stripe after host data is programmed to a logical unit (e.g., block, page, etc.) associated with the respective fault tolerant stripe. Component 113 can generate a combined set of redundancy metadata based on the generated redundancy metadata for each fault tolerant stripe and can store the combined set of redundancy metadata at a specified memory device 130, 140 of memory sub-system 110. In some embodiments, component 113 stores the combined set of redundancy metadata at a redundancy metadata storage location residing at a specified portion (e.g., a specified plane) of the specified memory device 130, 140.

Responsive to detecting a failure of a memory access operation performed for one or more data items at a LUN of a memory device 130, 140, component 113 can retrieve the combined set of redundancy metadata from the specified memory device 130, 140 (or the redundancy metadata storage location at the specified memory device 130, 140) and can perform a data recovery process to recover the one or more data items based on the combined redundancy metadata. In an illustrative example, component 113 can detect that a multi-plane memory access failure has occurred at one or more memory devices 130, 140 of memory sub-system 110. As described above, a multi-plane memory access failure can occur when a memory access operation to access data items at one or more memory pages at each plane of a particular memory device 130, 140 has failed. Component 113 can retrieve the combined set of redundancy metadata and can perform an XOR operation based at least on the combined set of redundancy metadata to generate one or more sets of redundancy metadata associated with a respective fault tolerant stripe. Component 113 can then execute one or more additional XOR operations using each set of redundancy metadata associated with each respective fault tolerant stripe to recover the data items of the failed memory pages. Further details regarding the generation and use of the combined set of redundancy metadata are provided herein.

Figure 2:
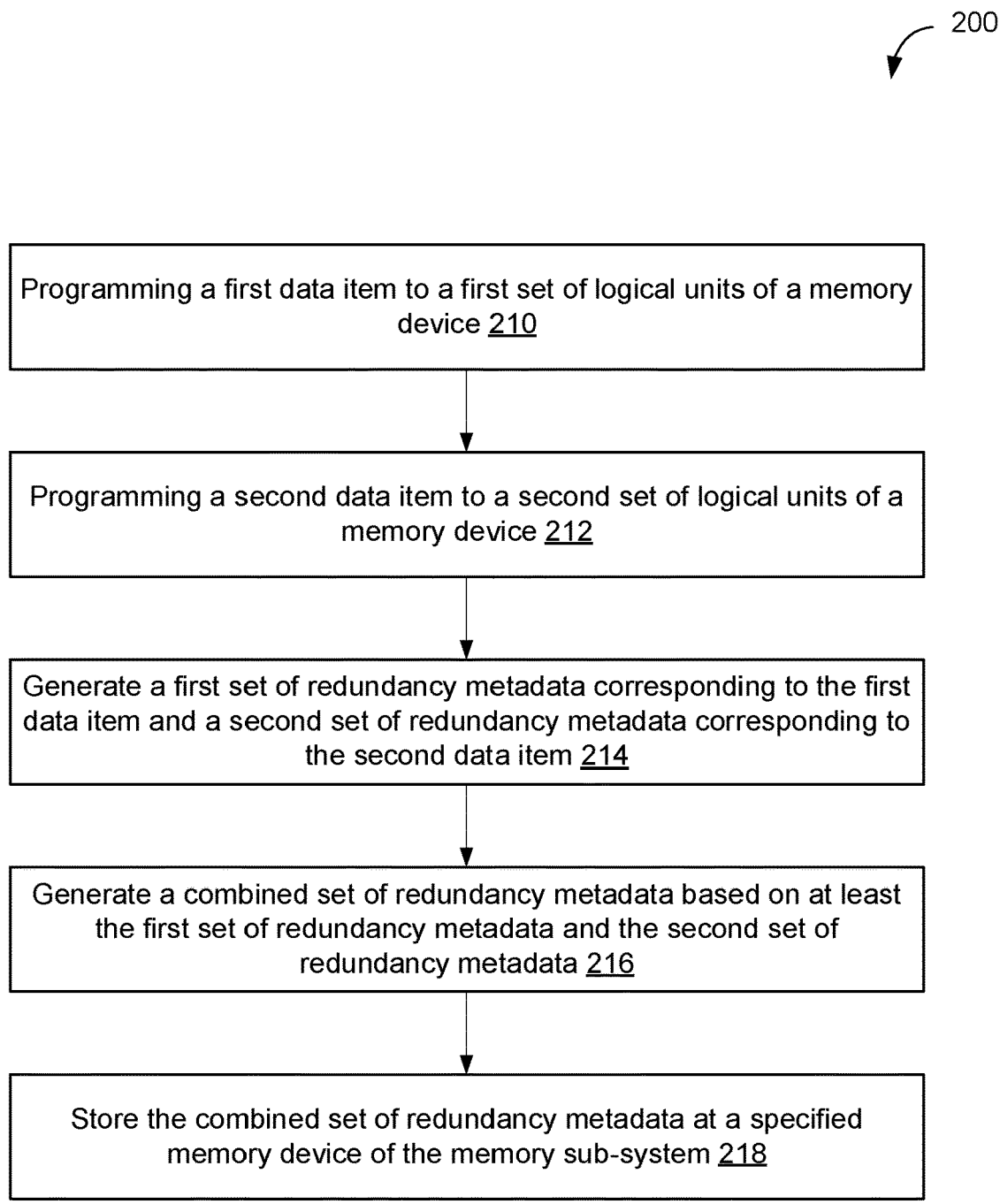
FIG. 2 is a flow diagram for generating redundancy metadata for a multi-plane memory access failure, in accordance with some embodiments of the present disclosure.

FIG. 2 is a flow diagram of an example method 200 for generating redundancy metadata for a multi-plane memory access failure, in accordance with some embodiments of the present disclosure. The method 200 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by the redundancy metadata manager component 113 of FIG. 1. In other or similar embodiments, one or more operations of method 200 is performed by another component of the memory sub-system controller 115, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 210, processing logic programs a first data item to a first set of logical units of a memory device. At block 212, processing logic programs a second data item to a second set of logical units of a memory device. As described above, a logical unit (LUN), or a set of logical units (LUNs), can correspond to a page, a block, etc. of a memory device of a memory sub-system (e.g., a memory device 130, 140 of memory sub-system 110). In some embodiments, the first set of LUNs can correspond to one or more memory pages at a memory device 130, 140 of memory sub-system 110 and the second set of LUNs can correspond to one or more additional memory pages at the memory device 130, 140. In other or similar embodiments, the first set of LUNs can correspond to one or more memory pages at a first memory device 130, 140 of memory sub-system 110 and the second set of LUNs can correspond to one or more memory pages of a second memory device 130, 140 of memory sub-system 110.

Figure 3A:
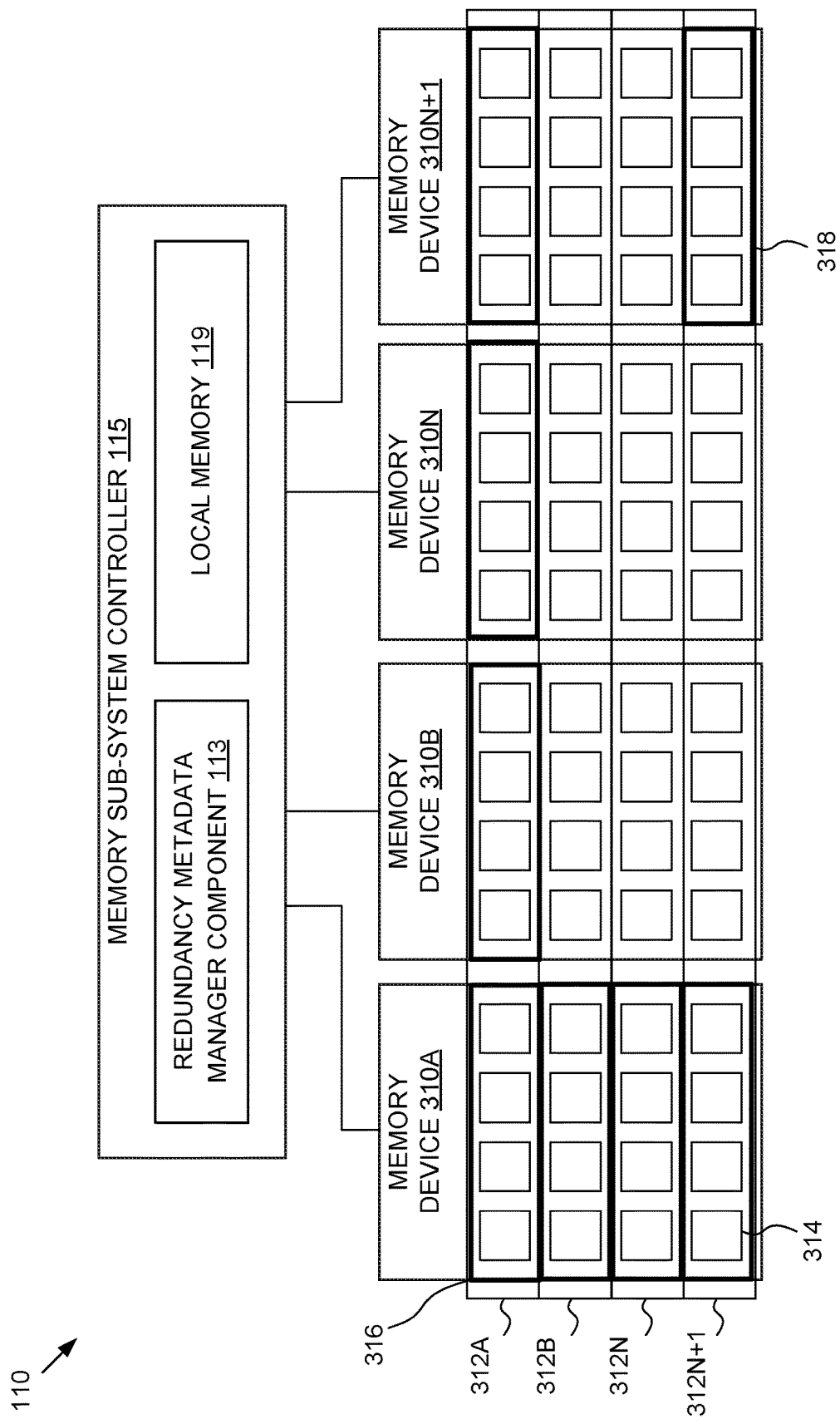
FIGS. 3A-3E depict an example of generating redundancy metadata for a multi-plane memory access failure, in accordance with some embodiments of the present disclosure.

In some embodiments, the first set of LUNs can be associated with a first fault tolerant stripe and the second set of LUNs can be associated with a second fault tolerant stripe. As discussed above, a fault tolerant stripe refers to a collection of LUNs at particular portions of two or more memory devices 130, 140 of memory sub-system 110 that store data items that are recoverable by memory sub-system controller 115. FIG. 3A depicts multiple memory devices 310 connected to a memory sub-system controller 115 of a memory sub-system and fault tolerant stripes 312 across each of the memory devices 310. In some embodiments, each memory device 310 illustrated in FIG. 3A (e.g., memory device 310A, 310B, 310N, and 310N+1) can correspond to a memory device 130, 140 described with respect to FIG. 1. It should be noted that although FIG. 3A depicts four memory devices 310 connected to memory sub-system controller 115, embodiments of the present disclosure can be directed to any number of memory devices (e.g., one memory device 310, two memory devices 310, four memory devices 310, eight memory devices 310, etc.) connected to any number of memory sub-system controllers 115 (e.g., one memory sub-system controller 115, two memory sub-system controllers 115, etc.).

As illustrated in FIG. 3A, multiple fault tolerant stripes 312 can reside across multiple memory devices 310. As described above, each memory device 310 can include one or more LUNs 314 (e.g., blocks, pages, etc.). A plane 316 at a respective memory device 310 can refer to a grouping of one or more LUNs 314 residing at a particular region of the memory device 310. In some embodiments, a memory device 310 can include at least two planes 316. For example, as illustrated in FIG. 3A, each memory device 310 connected to memory sub-system controller 115 can include four planes 316 that each include a grouping of one or more LUNs 314. It should be noted that although some embodiments of this disclosure are directed to memory devices 310 that include four planes 316, embodiments of this disclosure can be directed to memory devices 310 that include any number of planes 316 (e.g., two planes 316, four planes 316, eight planes 316, etc.).

In some embodiments, each plane 316 of a respective memory device 310 can be associated with a particular plane identifier and/or a particular plane address. For example, for a memory device 310 that includes four planes 316, a first plane 316 of the memory device 310 can be associated with a first identifier and/or a first address, a second plane 316 can be associated with a second identifier and/or a second address, a third plane 316 can be associated with a third identifier and/or a third address, and a fourth plane 316 can be associated with a fourth identifier and/or a fourth address. The identifier and/or address for the first, second, third and fourth planes 316 can be the same or approximately the same at each memory device 310, in some embodiments. In such embodiments, the redundancy metadata manager component 113 of memory sub-system controller 115 (or another component of memory sub-system controller 115) can associate each plane 316 having the same or a similar address and/or identifier at each memory device 310 with a particular fault tolerant stripe 312. In an illustrative example, each of memory devices 310A, 310B, 310N, and 310N+1 can include four planes 316, as described above. Memory sub-system controller 115 can associate the first planes 316 at each memory device 310 (i.e., that are associated with the same or similar first identifier and/or first address) with first fault tolerant stripe 312A. Memory sub-system controller can similarly associate the second planes 316 at each memory device 310 with second fault tolerant stripe 312B, the third plane (or nth plane) at each memory device 310 with third (or nth) fault tolerant stripe 312N, and the fourth (or nth+1 plane) at each memory device with fourth (or nth+1) fault tolerant stripe 312N+1.

In some embodiments, a particular portion of a particular memory device 310 connected to memory sub-system controller 115 can be reserved to store redundancy metadata generated for data items stored at other portions of the particular memory device 310, or at other memory devices 310 connected to memory sub-system controller 115. Such portion of the particular memory device 310 is referred to as a redundancy metadata storage location 318 herein. In some embodiments, the particular portion of the particular memory device 310 can be reserved before, during or after fabrication of memory devices 310 of the memory sub-system 110 and/or installation of the memory devices 310 of the memory sub-system 110. For example, an operator (e.g., an engineer, a developer, etc.) of the memory sub-system 110 can generate an identifier indicating the portion of the particular memory device 310 that is to be reserved as redundancy metadata storage location 318 and store the identifier at a portion of local memory 119. During an initialization of the memory sub-system 110, component 113 can determine the portion of the particular memory device 310 that is to be reserved as redundancy metadata storage location 318 based on the indication stored at local memory 119 and reserve the determined portion. In other or similar embodiments, component 113 can identify a portion of a memory device 310 to be reserved as redundancy metadata storage location 318 during an initialization and/or a runtime of memory sub-system 110. For example, during an initialization and/or a runtime of memory sub-system 110, component 113 can identify a portion of a memory device 310 at memory sub-system 110 that is available to store redundancy metadata (i.e., does not store any host data items). Component 113 can reserve the identified portion of the memory device 310 as redundancy metadata storage location 318, as described above. For purposes of example, FIG. 3A depicts a portion of memory device 310N+1 as including the redundancy metadata manager component 113. However, it should be noted that redundancy metadata manager component 113 can reserve any portion of any memory device 310.

Referring back to FIG. 2, as described above, processing logic can program a first data item to a first set of logical units 314 of a memory device 310 and a second data item to a second set of logical units 314 of a memory device 310. Processing logic can program the first data item and the second data item to LUNs at memory sub-system 110 responsive to receiving a request from host system 120, in some embodiments. In some embodiments, processing logic can receive a single notification from host system 120 that includes a request to program multiple data items at available LUNs of memory devices 310 (referred to as a batch programming request). In such embodiments, multiple data items of the request can include the first data item and/or the second data item. In other or similar embodiments, processing logic can receive one or more notifications from host system 120 that each include a request to program a single data item at an available LUN 314 of memory devices 310 (referred to as a single programming request). In such embodiments, processing logic can receive a first notification from host system 120 including a request to program the first data item to the first set of logical units 314 and a second notification from host system 120 including a request to program the second data item to the second set of logical units 314.

Figure 3B:
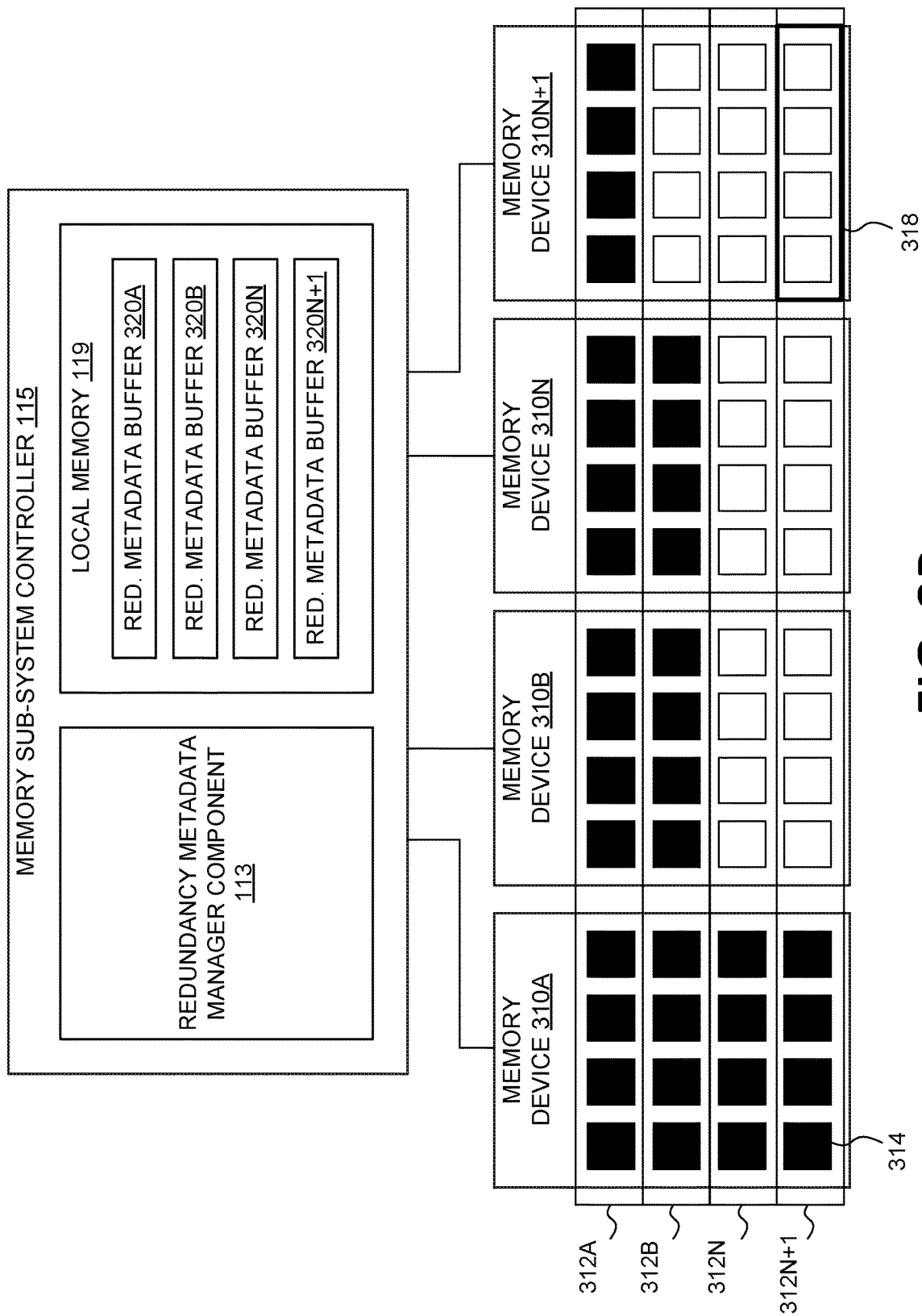

FIG. 3B depicts host data items programmed to memory devices 310 of memory sub-system 110. In some embodiments, memory sub-system controller 115 can program data items associated with one or more programming requests (e.g., batch programming requests, single programming requests, etc.) received from host system 120 to LUNs 314 of a respective memory device 310 of memory sub-system 110 until LUNs 314 at each plane 316 of the memory device 310 store host data items. For example, responsive to receiving the one or more requests to write the first data item and/or the second data item to LUNs of memory devices 310, memory sub-system controller 115 can program the first host data item to a first set of LUNs at a first plane 316 of memory device 310A and the second host data item to a second set of LUNs at a second plane 316 of memory device 310A. Memory sub-system controller 115 can continue to program host data items to LUNs memory device 310A until each LUN 314 stores a respective host data item, as illustrated in FIG. 3B. In other or similar embodiments, memory sub-system controller 115 can program host data items to LUNs 314 associated with a respective fault tolerant stripe 312 until each LUN associated with the fault tolerant stripe stores a respective host data item. For example, responsive to receiving the one or more requests to write the first data item and/or the second data item to LUNs of memory devices 310, memory sub-system controller 115 can program the first data item to LUNs of a first plane 316 of memory device 310A and the second data item to LUNs of a first plane 316 of memory device 310B. As described above, the first plane 316 of memory device 310A and the first plane of 316 memory device 310B are associated with the first fault tolerant stripe 312A, in some embodiments. In some embodiments, the number data items included in the one or more requests received from host system 120 are less than the number of data items that can be stored at LUNs 314 of a respective memory device 310 and/or a fault tolerant stripe 312. In such embodiments, memory sub-system controller 115 can program the data items to available LUNs at the respective memory device 310 and/or fault tolerant stripe 312 and leave the remaining LUNs of the memory device 310 and/or fault tolerant stripe 312 available for data items received in subsequent requests received from host system 120. As described above, the redundancy metadata storage location 318 at the specified memory device (e.g., memory device 310N+1) can be reserved to store redundancy metadata associated with host data items at other portions of the specified memory device (i.e., at the first, second and/or nth planes of memory device 310N+1) and at other memory devices 310 of memory sub-system 110. In such embodiments, memory sub-system controller 115 does not store host data items at the portion of the specified memory device reserved as the redundancy metadata storage location 318.

Referring back to FIG. 2, at block 214, processing logic generates a first set of redundancy metadata corresponding to first data item and a second set of redundancy metadata corresponding to the second data item. In some embodiments, processing logic can generate the first set of redundancy metadata by performing a redundancy metadata generation operation (e.g., an exclusive or (XOR) operation) based on host data stored at LUNs 314 associated with a fault tolerant stripe that stores the first data item. As described above, in one illustrative example, memory sub-system controller 115 can program the first data item to one or more LUNs associated with first fault tolerant stripe 312A. Component 113 can generate the first set of redundancy metadata by performing an XOR operation for the data items at each LUN associated with the first fault tolerant stripe 312A. In some embodiments, processing logic can generate the second set of redundancy metadata by performing the redundancy metadata generation operation based on host data stored at LUNs 314 associated with the fault tolerant stripe that stores the second data item. In another example, memory sub-system controller 115 can program the second data item to one or more LUNs associated with second fault tolerant stripe 312B. Component 113 can perform the XOR operation for the data items at each LUN associated with the second fault tolerant stripe 312B to generate the second set of redundancy metadata.

In some embodiments, one or more buffers 320 at local memory 119 of memory sub-system 110 can be allocated to temporarily store redundancy metadata for memory sub-system 110 (also referred to as redundancy metadata buffers 320 herein). Each of the buffers 320 can be allocated to temporarily store redundancy metadata for data items residing at LUNs associated with a respective fault tolerant stripe 312. Accordingly, the number of redundancy metadata buffers 320 allocated at local memory 119 can correspond to the number of fault tolerant stripes 312 of memory sub-system 110. For example, if a memory sub-system includes four fault tolerant stripes 312 (e.g., fault tolerant stripes 312A, B, N, and N+1), four buffers 320 (e.g., buffers 320A, B, N, and N+1) can be allocated at local memory 119. In some embodiments, component 113 can allocate each of the buffers 320 for a respective fault tolerant stripe 312 during an initialization and/or a runtime of memory sub-system 110. In other or similar embodiments, an operator (e.g., a developer, an engineer, etc.) can allocate a buffer 320 for each respective fault tolerant stripe 312 during fabrication and/or testing of memory sub-system 110.

As described above, a respective buffer 320 of local memory 119 can be reserved to store redundancy metadata generated for data items residing at LUNs associated with a respective fault tolerant stripe 312 of memory sub-system 110. For example, a first buffer 320A can be reserved to store redundancy metadata for data items residing at LUNs associated with first fault tolerant stripe 312A and a second buffer 320B can be reserved to store redundancy metadata for data items residing at LUNs associated with second fault tolerant stripe 312B. Component 113 can write the first set of redundancy metadata to first buffer 320A and the second set of redundancy metadata to second buffer 320B, in some embodiments.

At block 216, processing logic generates a combined set of redundancy metadata based on at least the first set of redundancy metadata and the second set of redundancy metadata. As described above, in some embodiments, the first set of redundancy metadata can be temporarily stored at first buffer 320A and the second set of redundancy metadata can be temporarily stored at second buffer 320B. In other or similar embodiments, additional sets of redundancy metadata can be temporarily stored at additional buffers 320 at local memory 119. For example, a nth set of redundancy metadata (generated for data items residing at LUNs associated with an nth fault tolerant stripe) can be stored at a buffer 320N of local memory 119 and/or a nth+1 set of redundancy metadata (generated for data items residing at LUNs associated with an nth+1 fault tolerant stripe) can be stored at a buffer 320N+1 of local memory 119. In such embodiments, processing logic (e.g., component 113) can further generate the combined set of redundancy metadata based on the nth set of redundancy metadata and/or the nth+1 set of redundancy metadata.

In some embodiments, component 113 can generate the combined set of redundancy metadata by performing a redundancy metadata generation operation (e.g., an XOR operation) based on at least two or more sets of redundancy metadata stored at buffers 320. For example, component 113 can generate a combined set of redundancy metadata by performing an XOR operation based on at least the first set of redundancy metadata temporarily stored at buffer 320A and the second set of redundancy metadata temporarily stored at buffer 320B. In some embodiments, applying the XOR operation to at least the first set of redundancy metadata and the second set of redundancy metadata can generate a first combined set of redundancy metadata. In some embodiments, component 113 can generate a second combined set of redundancy metadata by applying the XOR operation to at least the first combined set of redundancy metadata and the nth set of redundancy metadata (i.e., temporarily stored at buffer 320N. In some further embodiments, component 113 can apply the XOR operation to at least the second combined set of redundancy metadata and the nth+1 set of redundancy metadata to generate a third combined set of redundancy metadata. In such embodiments, the combined set of redundancy metadata described herein shall correspond to the third combined set of redundancy metadata.

Figure 3C:
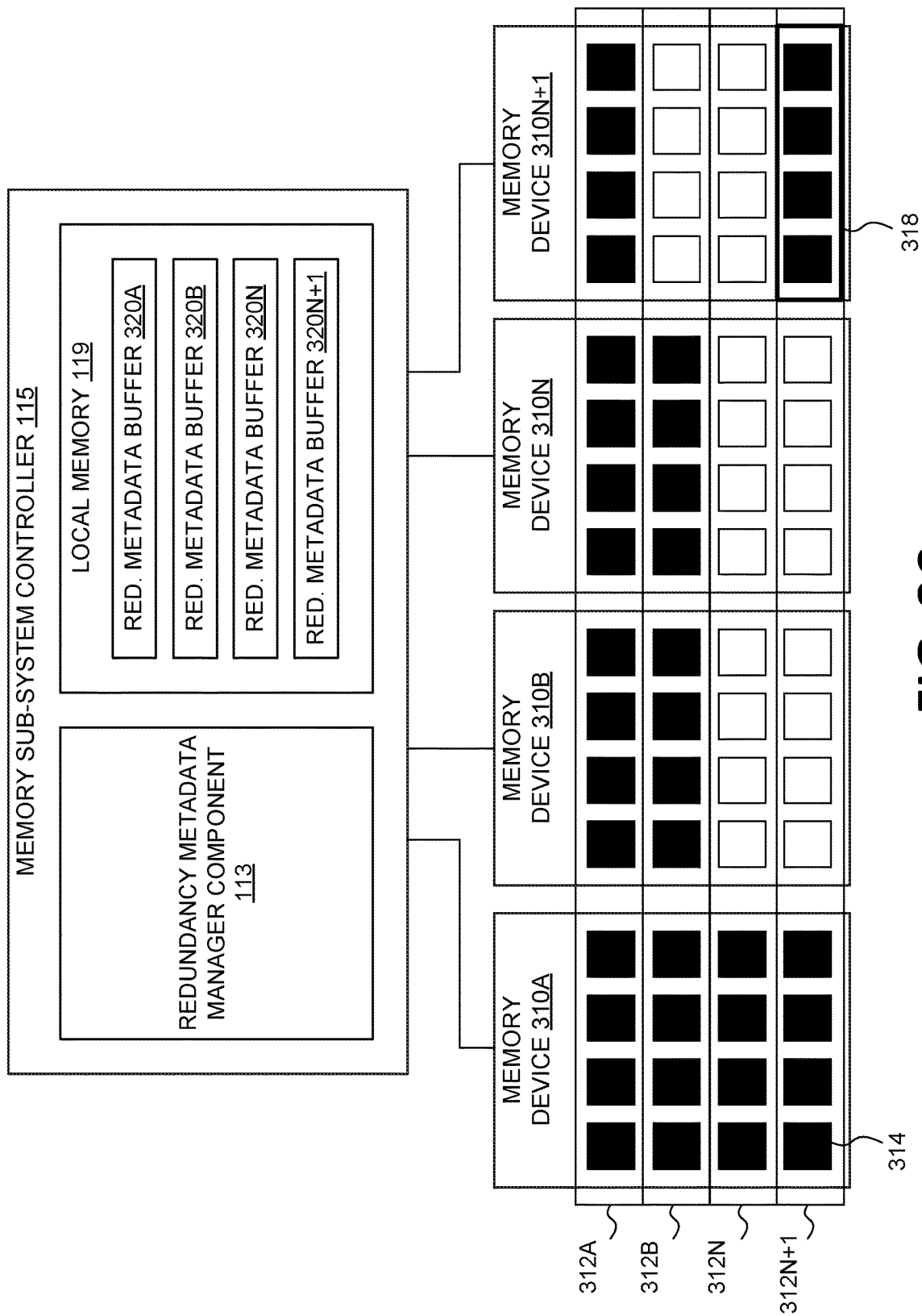

At block 218, processing logic writes the combined set of redundancy metadata to a specified memory device of the memory sub-system. In some embodiments, processing logic (e.g., component 113) can write the combined set of redundancy metadata to the redundancy metadata storage location 318 of the specified memory device 310 of memory sub-system 110, as illustrated in FIG. 3C. In response to writing the combined set of redundancy metadata to the redundancy metadata storage location 318 of the specified memory device (e.g., memory device 310N+1), component 113 can erase each combined set of redundancy metadata from redundancy metadata buffers 320.

In some embodiments, memory sub-system controller 115 can detect that an operation to access a data item residing at one or more LUNs of a memory device 310 has failed. For example, memory sub-system controller 115 can detect that one or more operations to access data items residing at LUNs associated with each plane of a particular memory device 310 has failed (i.e., a multi-plane failure has occurred). In such embodiments, component 113 can retrieve the combined set of redundancy metadata (or the updated combined set of redundancy metadata) from redundancy storage location 318 and use the combined set of redundancy metadata to restore the failed data items (e.g., of the multi-plane failure), in accordance with embodiments described with respect to FIG. 5 below.

During operation of memory sub-system 110, memory sub-system controller 115 can receive requests from host system 120 to store additional data items to available LUNs of memory sub-system 110. Responsive to memory sub-system controller 115 programming the newly received data items to the available LUNs of memory sub-system 110, component 113 can generate updated redundancy metadata for the data items programmed to LUNs associated with each respective fault tolerant stripe 312, in accordance with previously described embodiments. In some embodiments, each updated set of redundancy metadata can correspond to the new data items as well as the previous data items programmed to LUNs associated with a respective fault tolerant stripe. Component 113 can generate an updated combined set of redundancy metadata based on each updated set of redundancy metadata temporarily stored at metadata buffers 320, as previously described. Responsive to generating the updated combined set of redundancy metadata, component 113 can replace the combined set of redundancy metadata stored at redundancy metadata storage location 318 with the updated combined set of redundancy metadata.

Figure 3D:
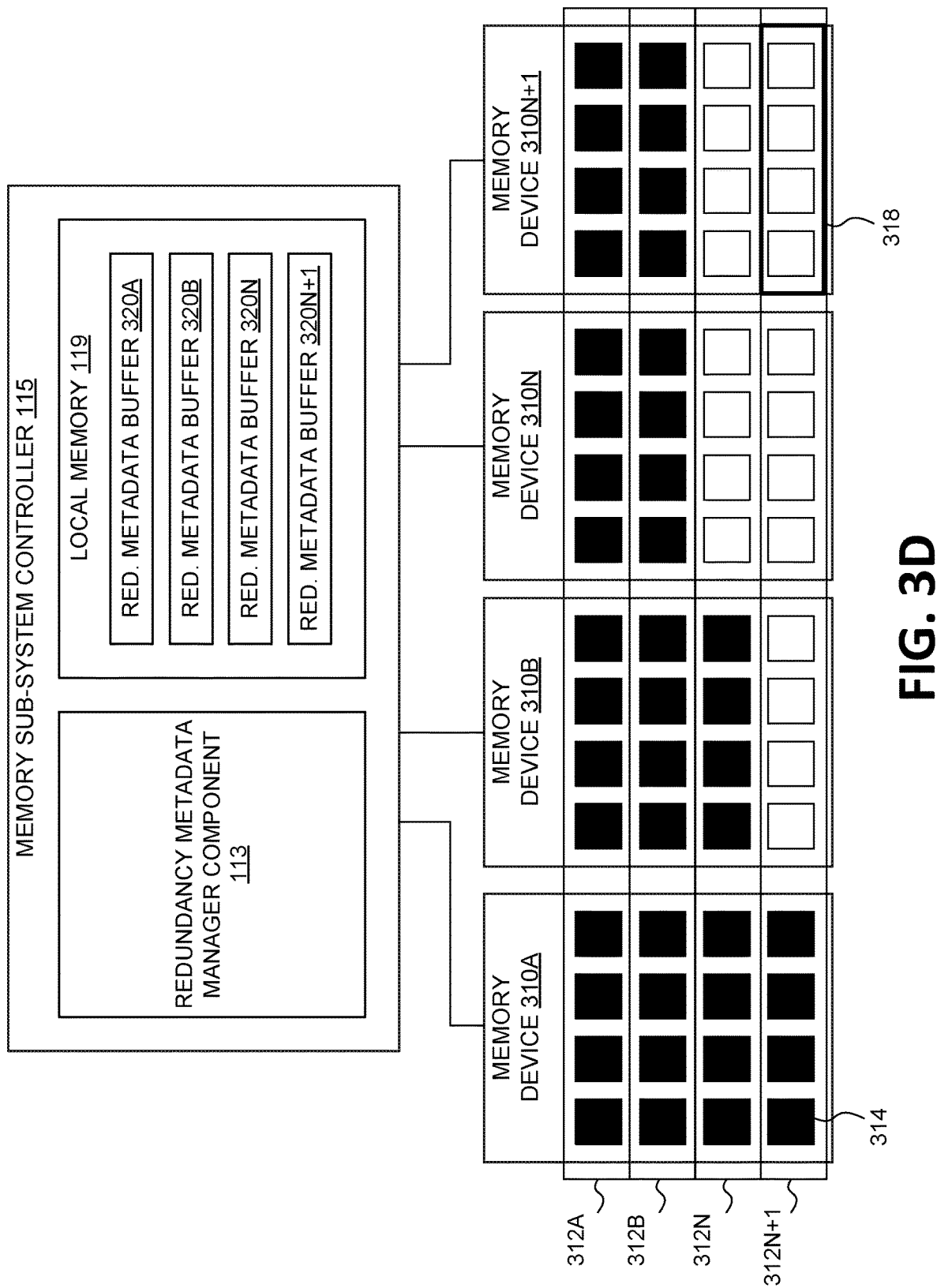
Figure 3E:
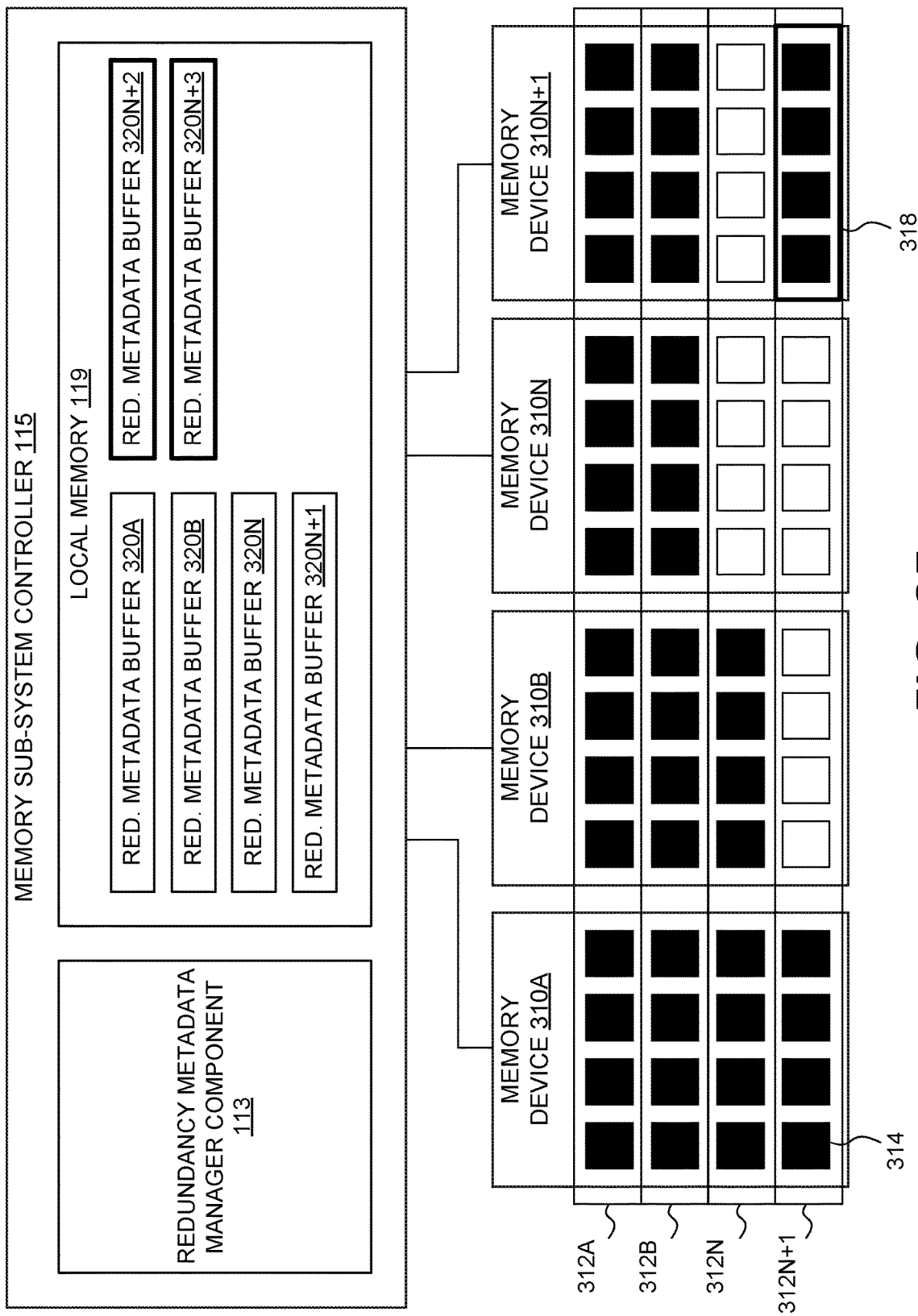

In some embodiments, memory sub-system controller 115 can receive additional requests from host system 120 to store additional data items after component 113 has generated a set of redundancy metadata associated with each fault tolerant stripe 312 of memory sub-system 110 but before component 113 has generated the combined set of redundancy metadata. As illustrated in FIG. 3D, memory sub-system controller 115 can program additional data items to available LUNs 314 of memory sub-system 110 (e.g., LUNs 314 at an nth plane of memory device 310B, LUNs 314 at a second plane of memory device 310N+1, etc.) before component 113 generates and stores the combined set of redundancy metadata at redundancy metadata storage location 318. In such embodiments, redundancy metadata manager component 113 can allocate one or more additional redundancy metadata buffers 320 to store an updated set of redundancy metadata corresponding to the fault tolerant stripes 312 that include LUNs 314 that store the additional data items. For example, memory sub-system controller 115 can program additional data items to available LUNs 314 at an nth plane of memory device 310B and LUNs 314 at a second plane of memory device 310N+1. As illustrated in FIG. 3E, component 113 can allocate redundancy metadata buffer 320N+2 to store an updated set of redundancy metadata associated with fault tolerant stripe 312N and redundancy metadata buffer 320N+3 to store an updated set of redundancy metadata associated with fault tolerant stripe 312B.

Responsive to storing the updated set of redundancy metadata associated with fault tolerant stripes 312N and 312B to buffers 320N+2 and 320N+3, respectively, component 113 can generate the combined set of redundancy metadata based on the current sets of redundancy metadata stored at one or more of buffers 320. For example, in accordance with previously described embodiments, buffer 320N can store prior redundancy metadata associated with fault tolerant stripe 312N and buffer 320B can store prior redundancy metadata associated with fault tolerant stripe 312B. Redundancy metadata manager component 113 can disregard the prior sets of redundancy metadata stored at buffers 320N and 320B and instead generate the combined set of redundancy metadata based on the sets of redundancy metadata stored at buffers 320A, 320N+1, 320N+2, and 320N+3, in accordance with previously described embodiments.

Responsive to writing the combined set of redundancy metadata to redundancy metadata storage location 318, component 113 can erase each set of redundancy metadata from buffers 320. In some embodiments, component 113 can erase each set of redundancy metadata from buffers 320 responsive to determining that an operation to program data items to LUNs 314 associated with a respective fault tolerant stripe 312 has successfully completed (i.e., the data items are successfully programmed to memory sub-system 110). In some embodiments, component 113 can further de-allocate one or more buffers 320 at local memory 119 to be made available for other processes associated with memory sub-system 110. For example, component 113 can de-allocate each buffer 320 from local memory 119. In another example, component 113 can de-allocate one or more buffers 320 from local memory 119 that were allocated to store updated sets of redundancy metadata (e.g., buffers 320N+2 and/or 320N+3).

Figure 4:
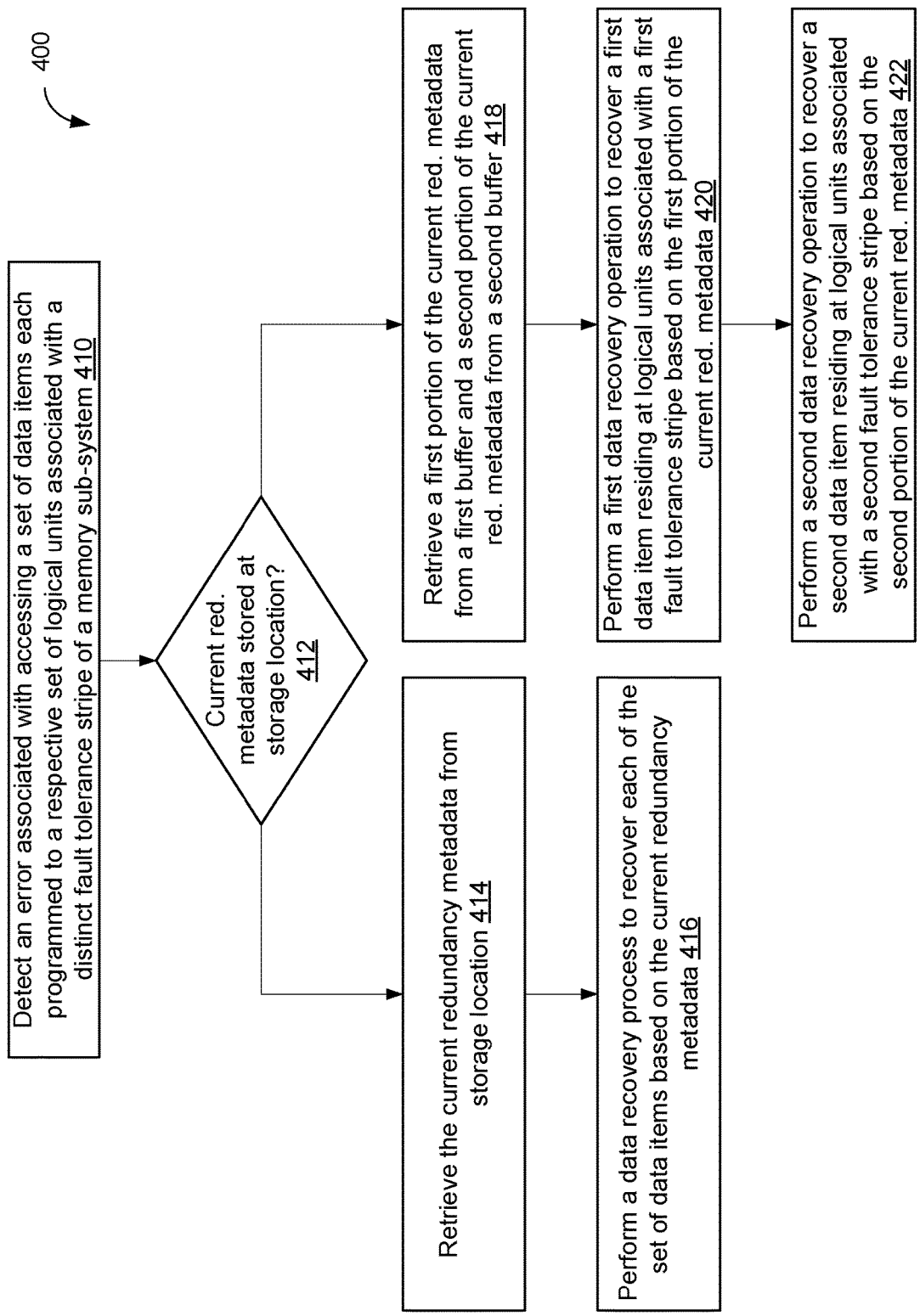
FIG. 4 is a flow diagram for using redundancy metadata generated for a multi-plane memory access failure, in accordance with some embodiments of the present disclosure.

FIG. 4 is a flow diagram of an example method 400 for using redundancy metadata generated for a concurrent multi-plane memory access failure, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the redundancy metadata manager component 113 of FIG. 1. In other or similar embodiments, one or more operations of method 400 is performed by another component of the memory sub-system controller, or by a component of local media controller 135. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 410, processing logic can detect an error associated with a set of data items each programmed to a respective set of LUNs associated with a distinct fault tolerance stripe of a memory sub-system. In some embodiments, the memory sub-system can correspond to memory sub-system 110 describe with respect to FIGS. 3A-3E. In such embodiments, each of the set of data items can correspond to data items programmed to LUNs 314 associated with distinct fault tolerant stripes 312 of memory sub-system. For example, one or more first data items of the set of data items can be programmed to LUNs 314 associated with first fault tolerant stripe 312A (e.g., at a first plane of memory device 310A), one or more second data items of the set of data items can be programmed to LUNs 314 associated with second fault tolerant stripe 312B (e.g., at a second plane of memory device 310A), one or more nth data items of the set of data items can be programmed to LUNs 314 associated with nth fault tolerant stripe 312N (e.g., at a nth plane of memory device 310A), and one or more nth+1 data items of the set of data items can be programmed to LUNs 314 associated with nth+1 fault tolerant stripe 312N+1 (e.g., at a nth+1 plane of memory device 310A). It should be noted that although some embodiments and/or examples of the present disclosure are directed to data items programmed to LUNs of planes at memory device 310A, embodiments and/or examples of the present disclosure can be applied to data items programmed to LUNs of planes at any memory device (e.g., memory device 310A, 312B, 312N, 312N+1) of memory sub-system 110.

Referring back to FIG. 4, at block 412, processing logic can determine whether current redundancy metadata is stored at a redundancy metadata storage location. As described above, a specified portion of a specified memory device of the memory sub-system can be reserved to store redundancy metadata data for data items stored at LUNs of another portion of the specified memory device and LUNs of other memory devices of the memory sub-system. In some embodiments, the redundancy metadata storage location can correspond to redundancy metadata storage location 318, described with respect to FIGS. 3A-3E. Current redundancy metadata can refer to redundancy metadata that can be used by component 113 to retrieve or recover current data items programmed to LUNs of memory sub-system 110. For example, as described above, in some embodiments, component 113 can generate sets of redundancy metadata for data items residing at LUNs of each respective fault tolerant stripe 312 after the data items are programmed to the LUNs and store each generated set of redundancy metadata to a respective buffer 320. Component 113 can then generate a combined set of redundancy metadata based on each generated set of redundancy metadata and store the combined set of redundancy metadata at redundancy metadata storage location 318, as described above. The combined set of redundancy metadata at the redundancy metadata storage location 318 can correspond to current redundancy metadata for the memory sub-system 110 because the combined set of redundancy metadata at redundancy metadata storage location 318 can be used by component 113 to recover each data item programmed to LUNs of memory sub-system 110. After component 113 stores the combined set of redundancy metadata at redundancy metadata storage location 318, memory sub-system controller 115 can program additional data items to available LUNs of memory sub-system 110, as described above. The combined set of redundancy metadata at redundancy metadata storage location 318 is no longer current redundancy metadata for memory sub-system 110 because component 113 cannot use the combined set of redundancy metadata to recover each data item programmed to LUNs of memory sub-system 110.

In some embodiments, component 113 can determine whether current metadata is stored at current redundancy metadata storage location 318 by determining whether any redundancy metadata is stored at current redundancy metadata storage location 318 and/or whether a set (or an updated set) of redundancy metadata is stored at any of buffers 320. In other or similar embodiments, component 113 can determine whether current metadata is stored at current redundancy metadata storage location 318 based on an indication stored at a particular portion of memory (e.g., local memory 119) associated with memory sub-system controller 115. For example, component 113 can maintain a redundancy metadata bit stored at a portion of local memory 119. When current metadata is stored at current redundancy metadata storage location 318, component 113 can set the bit (e.g., to 0 or 1) to indicate that current redundancy metadata is stored at redundancy metadata storage location 318. When memory sub-system controller 115 programs additional data items to available LUNs of memory sub-system 110, component 113 can flip the bit (e.g., from 0 to 1 or from 1 to 0) to indicate that the combined set of redundancy metadata stored at redundancy metadata storage location 318 is no longer current redundancy metadata for memory sub-system 110.

Responsive to processing logic determining that current redundancy metadata is stored at the redundancy metadata storage location, method 400 can proceed to block 414. At block 414, processing logic can retrieve the current redundancy metadata (i.e., the combined set of redundancy metadata) from the redundancy metadata storage location (e.g., redundancy metadata storage location 318). At block 516, processing logic can perform a data recovery process to recover the each of the set of data items based at least in part on the current redundancy metadata data. In an illustrative example, processing logic (e.g., component 113) can execute one or more XOR operations based on at least the combined set of redundancy metadata to generate one or more sets of redundancy metadata associated with a respective fault tolerant stripe 312. In some embodiments, component 113 can execute an XOR operation based on at least the combined set of redundancy metadata to generate a set of redundancy metadata for the data items residing at LUNs associated with fault tolerant stripe 312N+1 (referred to as the nth+1 set of redundancy metadata). Component 113 can execute the XOR operation based on at least the nth+1 set of redundancy metadata to generate another set of redundancy metadata that for the data items residing at LUNs 314 associated with fault tolerant stripe 312N (referred to as the nth set of redundancy metadata). In some further embodiments, component 113 can execute the XOR operation based on at least the nth set of redundancy metadata to generate a second set of redundancy metadata for the data items residing at LUNs associated with the second fault tolerant stripe 312B. Component 113 can further execute the XOR operation based on at least the second set of redundancy metadata to generate a first set of redundancy metadata for the data items residing at LUNs associated with the first fault tolerant stripe 312A. In some embodiments, component 113 can store a generated set of redundancy metadata associated with a respective fault tolerant stripe to a buffer 320 that is allocated to temporarily store the redundancy metadata associated with the respective fault tolerant stripe 312. In other or similar embodiments, component 113 can allocate one or more additional memory buffers 320 at local memory 119 to temporarily store the generated sets of redundancy metadata, in accordance with previously described embodiments.

Responsive to generating the one or more sets of redundancy metadata (e.g., the first, second, nth, and/or nth+1 sets of redundancy metadata), component 113 can execute one or more XOR operations based on each of the generated sets of redundancy metadata to recover the failed data items associated with each fault tolerant stripe 312 of memory sub-system 110. For example, component 113 can execute a first XOR operation based on at least the first set of redundancy metadata to recover the failed data item residing on LUNs associated with first fault tolerant stripe 312A, a second XOR operation based on at least the second set of redundancy metadata to recover the failed data item residing on LUNs associated with second fault tolerant stripe 312B, a nth XOR operation based on at least the nth set of redundancy metadata to recover the failed data item residing on LUNs associated with nth fault tolerant stripe 312N, and/or a nth+1 XOR operation based on at least the nth+1 set of redundancy metadata to recover the failed data item residing on LUNs associated with the nth+1 fault tolerant stripe 312N+1. In other or similar embodiments, component 113 can execute a single XOR operation based on each generated set of redundancy metadata to recover the data items residing on LUNs associated with each fault tolerant stripe 312.

Responsive to component 113 recovering the failed data items using the generated sets of redundancy metadata, memory sub-system controller 115 can store the recovered data items to another memory device 310 and/or portion of a memory device 310. For example, if each of the failed data items were originally programmed to memory device 310A, memory sub-system controller 115 can store the recovered data items to available LUNs of one or more other memory devices (e.g., memory devices 310B, 310N and/or 310N+1).

Referring back to block 412, responsive to processing logic determining that current redundancy metadata is not stored at the redundancy metadata storage location, method 400 can proceed to block 418. At block 418, processing logic can retrieve a first portion of the current redundancy metadata from a first redundancy metadata buffer 320A and a second portion of the current redundancy metadata from a second redundancy metadata buffer 320B. As described above, processing logic (e.g., component 113) can generate sets of redundancy metadata associated with each fault tolerant stripe 312 of memory sub-system 110 and temporarily store each set of redundancy metadata at a buffer 320 associated with a respective fault tolerant stripe 312. In some embodiments, each buffer 320 can store the current set of redundancy metadata associated with a respective fault tolerant stripe 312, as described above. The current set of redundancy metadata stored at the memory buffers 320 can correspond to a portion of the current redundancy metadata for the memory sub-system 110. For example, a first set of redundancy metadata temporarily stored at buffer 320A associated with fault tolerant stripe 312A can correspond to a first portion of the current redundancy metadata for memory sub-system 110, a second set of redundancy metadata temporarily stored at buffer 320B associated with fault tolerant stripe 312B can correspond to a second portion of the current redundancy metadata, and so forth. As described above, component 113 can retrieve the first set of redundancy metadata generated for data items residing at LUNs associated with first fault tolerant stripe 312A (i.e., the first portion of the current redundancy metadata) from buffer 320A and the second set of redundancy metadata generated for data items residing at LUNs associated with second fault tolerant stripe 312B (i.e., the second portion of the current redundancy metadata) from buffer 320B. In some embodiments, component 113 can also retrieve a nth set of redundancy metadata generated for data items residing at LUNs associated with fault tolerant stripe 312n (i.e., the nth portion of the current redundancy metadata) from buffer 320N and/or a nth+1 set of redundancy metadata generated for data items residing at LUNs associated with fault tolerant stripe 312N+1 (i.e., the nth+1 portion of the current redundancy metadata) from buffer 320N+1.

At block 420, processing logic can perform a first data recovery operation to recover a first data item residing at LUNs associated with a first fault tolerant stripe (e.g., fault tolerant stripe 312A) based on the first portion of the current redundancy metadata. In an illustrative example, processing logic (e.g., component 113) can perform an XOR operation based on at least the first set of redundancy metadata (i.e., that is temporarily stored at buffer 320A) to recover the first data item, in accordance with previously described embodiments. At block 422, processing logic can perform a second data recovery operation to recover a second data item residing at LUNs associated with a second fault tolerant stripe (e.g., fault tolerant stripe 312B) based on the second portion of the current redundancy metadata. In another illustrative example, component 113 can perform the XOR operation based on at least the second set of redundancy metadata (i.e., that is temporarily stored at buffer 320B) to recover the first data item, in accordance with previously described embodiments. In some embodiments, component 113 can further perform the XOR operation based on at least the nth set of redundancy metadata (i.e., that is temporarily stored at buffer 320N) to recover a nth data item and/or based on at least the nth+1 set of redundancy metadata (i.e., that is temporarily stored at buffer 320N+1) to recover a nth+1 data item. In response to component 113 recovering the first data item and the second data item (and/or the nth data item and the nth+1 data item, memory sub-system controller 115 can store the recovered data items to another memory device 310 or portion of a memory device 310, in accordance with previously described embodiments.

Figure 5:
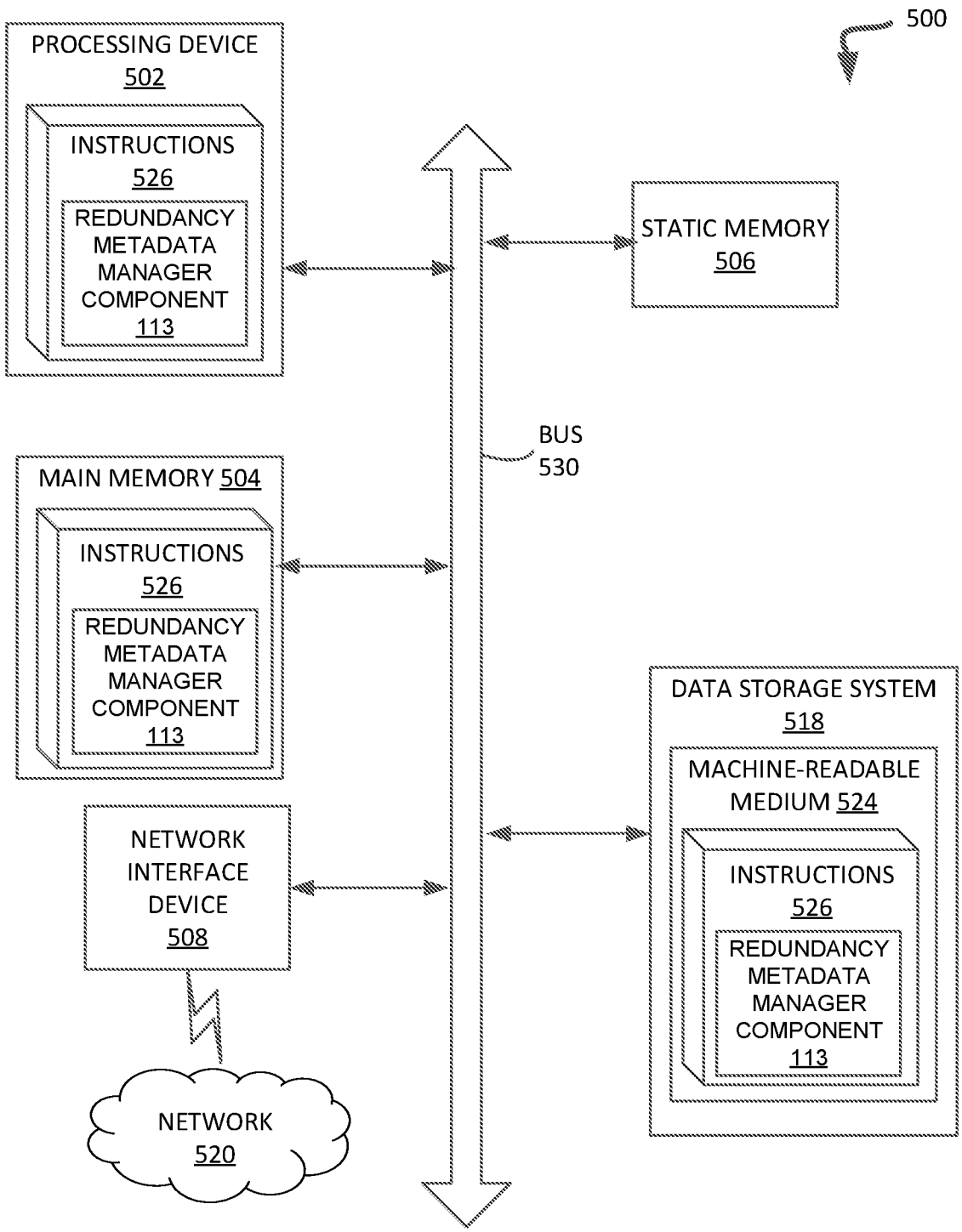
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the redundancy metadata manager component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or RDRAM, etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 704 can correspond to the memory sub-system 110 of FIG. 1.

In one embodiment, the instructions 526 include instructions to implement functionality corresponding to a voltage bin boundary component (e.g., the redundancy metadata manager component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    initiating a first operation to program a first data item to a first set of logical units of a memory sub-system, wherein the first set of logical units is associated with a first fault tolerant stripe;
    initiating a second operation to program a second data item to a second set of logical units of the memory sub-system, wherein the second set of logical units is associated with a second fault tolerant stripe;
    generating a first set of redundancy metadata corresponding to the first data item and a second set of redundancy metadata corresponding to the second data item;
    writing the first set of redundancy metadata and the second set of redundancy metadata to a first memory location of the memory sub-system;
    generating a combined set of redundancy metadata based on at least the first set of redundancy metadata and the second set of redundancy metadata;
    storing the combined set of redundancy metadata at a second memory location of a specified memory device of the memory sub-system; and
    responsive to determining that the first data item and the second data item have been successfully programmed, erasing the first set of redundancy metadata and the second set of redundancy metadata from the first memory location.

2. The method of claim 1, wherein generating the first set of redundancy metadata comprises executing an exclusive or (XOR) operation based on the first data item, and wherein generating the second set of redundancy metadata comprises executing the XOR operation based on the second data item.

3. The method of claim 1, wherein generating the combined set of redundancy metadata comprises executing an exclusive or (XOR) operation based on the first set of redundancy metadata and the second set of redundancy metadata.

4. The method of claim 1, wherein the combined set of redundancy metadata is stored at a specified plane of the specified memory device of the memory sub-system.

5. The method of claim 1, wherein writing the first set of redundancy metadata and the second set of redundancy metadata to the first memory location of the memory sub-system comprises:
    writing the first set of redundancy metadata to a first redundancy metadata buffer of the first memory location and the second set of redundancy metadata to a second redundancy metadata buffer of the first memory location.

6. The method of claim 5, wherein the combined set of redundancy metadata is further generated based on a third set of redundancy metadata stored at a third redundancy metadata buffer of the first memory location.

7. The method of claim 5,
    wherein the first set of redundancy metadata is erased from the first redundancy metadata buffer of the first memory location and the second set of redundancy metadata is erased from the second redundancy metadata buffer of the first memory location.

8. The method of claim 1, wherein the first fault tolerant stripe and the second fault tolerant stripe each correspond to least one of a page stripe or a block stripe.

9. A non-transitory computer-readable storage medium comprising instructions that, when executed by a processing device, cause the processing device to perform operations comprising:
    initiating a first operation to program a first data item to a first set of logical units of a memory sub-system, wherein the first set of logical units is associated with a first fault tolerant stripe;
    initiating a second operation to program a second data item to a second set of logical units of the memory sub-system, wherein the second set of logical units is associated with a second fault tolerant stripe;
    generating a first set of redundancy metadata corresponding to the first data item and a second set of redundancy metadata corresponding to the second data item;
    writing the first set of redundancy metadata at the second set of redundancy metadata to a first memory location of the memory sub-system;
    generating a combined set of redundancy metadata based on at least the first set of redundancy metadata and the second set of redundancy metadata;
    storing the combined set of redundancy metadata at a second memory location of a specified memory device of the memory sub-system; and
    responsive to determining that the first data item and the second data item have been successfully programmed, erasing the first set of redundancy metadata and the second set of redundancy metadata from the first memory location.

10. The non-transitory computer-readable storage medium of claim 9, wherein generating the first set of redundancy metadata comprises executing an exclusive or (XOR) operation based on the first data item, and wherein generating the second set of redundancy metadata comprises executing the XOR operation based on the second data item.

11. The non-transitory computer-readable storage medium of claim 9, wherein generating the combined set of redundancy metadata comprises executing an exclusive or (XOR) operation based on the first set of redundancy metadata and the second set of redundancy metadata.

12. The non-transitory computer-readable storage medium of claim 9, wherein the combined set of redundancy metadata is stored at a specified plane of the specified memory device of the memory sub-system.

13. The non-transitory computer-readable storage medium of claim 9, wherein writing the first set of redundancy metadata and the second set of redundancy metadata to the first memory location of the memory sub-system comprises:
    writing the first set of redundancy metadata to a first redundancy metadata buffer of the first memory location and the second set of redundancy metadata to a second redundancy metadata buffer of the first memory location.

14. The non-transitory computer-readable storage medium of claim 9, wherein the combined set of redundancy metadata is further generated based on a third set of redundancy metadata stored at a third redundancy metadata buffer of the first memory location.

15. A system comprising:
    a memory; and
    a processing device coupled to the memory, the processing device to perform operations comprising:
        initiating a first operation to program a first data item to a first set of logical units of the memory, wherein the first set of logical units is associated with a first fault tolerant stripe;
        initiating a second operation to program a second data item to a second set of logical units of the memory, wherein the second set of logical units is associated with a second fault tolerant stripe;
        generating a first set of redundancy metadata corresponding to the first data item and a second set of redundancy metadata corresponding to the second data item;
        writing the first set of redundancy metadata and the second set of redundancy metadata to a first memory location of the memory;
        generating a combined set of redundancy metadata based on at least the first set of redundancy metadata and the second set of redundancy metadata;
        storing the combined set of redundancy metadata at a second memory location of a specified memory device of the memory; and
        responsive to determining that the first data item and the second data item have been successfully programmed, erasing the first set of redundancy metadata and the second set of redundancy metadata from the first memory location.

16. The system of claim 15, wherein generating the first set of redundancy metadata comprises executing an exclusive or (XOR) operation based on the first data item, and wherein generating the second set of redundancy metadata comprises executing the XOR operation based on the second data item.

17. The system of claim 15, wherein generating the combined set of redundancy metadata comprises executing an exclusive or (XOR) operation based on the first set of redundancy metadata and the second set of redundancy metadata.

18. The system of claim 15, wherein the combined set of redundancy metadata is stored at a specified plane of the specified memory device of the memory.

19. The system of claim 15, wherein writing the first set of redundancy metadata and the second set of redundancy metadata to the first memory location of the memory comprises:
    writing the first set of redundancy metadata to a first redundancy metadata buffer of the first memory location and the second set of redundancy metadata to a second redundancy metadata buffer of the first memory location.

20. The system of claim 19, wherein the combined set of redundancy metadata is further generated based on a third set of redundancy metadata stored at a third redundancy metadata buffer of the first memory location.

* * * * *